Oct. 3, 1961

P. MARSAL 3,003,016

GALVANIC BATTERY

Filed Sept. 2, 1943

INVENTOR
PAUL MARSAL
BY

ATTORNEY

Oct. 3, 1961 P. MARSAL 3,003,016
GALVANIC BATTERY
Filed Sept. 2, 1943 3 Sheets-Sheet 2

INVENTOR
PAUL MARSAL
BY
ATTORNEY

Oct. 3, 1961 P. MARSAL 3,003,016
GALVANIC BATTERY
Filed Sept. 2, 1943 3 Sheets-Sheet 3
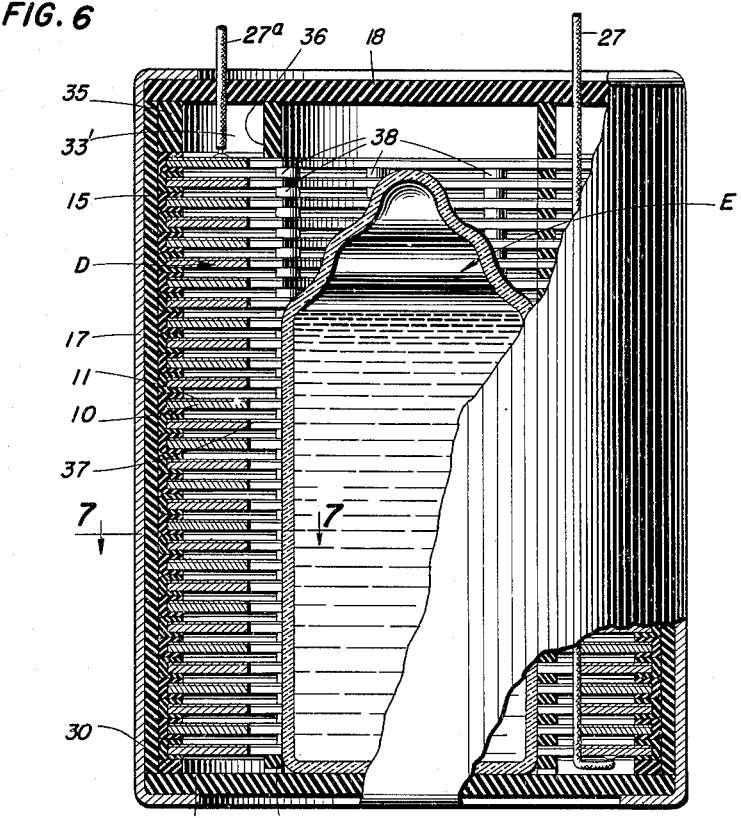
FIG. 6
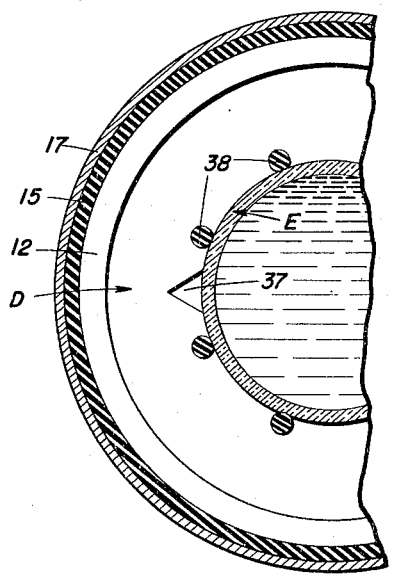
FIG. 7
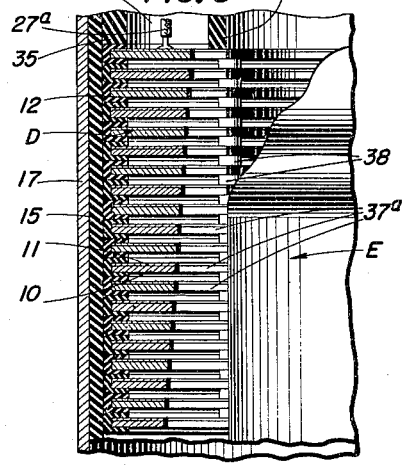
FIG. 8
INVENTOR
PAUL MARSAL
BY
ATTORNEY

United States Patent Office 3,003,016
Patented Oct. 3, 1961

3,003,016
GALVANIC BATTERY
Paul Marsal, Rocky River, Ohio, assignor, by mesne assignments, to the United States of America as represented by the Secretary of the Navy
Filed Sept. 2, 1943, Ser. No. 501,001
12 Claims. (Cl. 136—90)

This invention relates to batteries and more particularly to a novel galvanic battery or cell of compact construction which has a long shelf life and is positive and reliable in operation under adverse conditions of use.

Electrically operated devices have been developed for use in the fuze of an explosive projectile in flight. Such devices require compact sources of electricity, for instance galvanic cells and batteries. Although known, commercially available types of batteries can be adapted to serve the purpose, the peculiarly severe service requirements are not very well met by batteries originally designed for other uses. The present invention relates to galvanic cells and batteries of improved and novel construction, the characteristics of which particularly adapt them for use in projectiles.

To fit within the nose of a projectile of small or intermediate caliber, and to leave enough room for the fuze and its operating devices, the galvanic device must be very compact. Compactness of a galvanic battery is obtained ordinarily by limiting the space devoted to structures not directly involved in the generation of electricity, for instance intercell insulation and electrolyte sealing. In a device for use in a projectile, on the other hand, the economy of space must not be achieved at the expense of shelf life under adverse atmospheric conditions, for a projectile fuze may be stored for many months underground or aboveground or on shipboard, in any part of the world, and be required after such storage to operate unfailingly and promptly when fired from a gun, or the like.

Any device for use in a projectile must be rugged and dependable in action. At the moment of firing the projectile from a rifled gun, there is a large acceleration or "setback" shock, and the spin imparted by the rifling of the gun barrel creates centrifugal forces of considerable magnitude. But, because of the short life of a projectile after discharge from a gun, it is not necessary that the electrical devices therein be supplied with electricity over a very long period of time.

Generally, the electrical characteristics of voltage and current which are desired are not much different from those supplied by "A," "B" and "C" batteries for radio use. There is a demand not only for each of these types but also for units comprising two or more such types in combination.

A general object of this invention is to provide galvanic cells and batteries having characteristics suiting them for use under the service conditions just described. Other, more specific objects are described below.

To meet the requirement of a very long shelf life, it is desirable to use the principle of the deferred action, wherein the galvanic elements are kept dry and at least the liquid portion of electrolyte is kept in a fluid-tight container until the cell or battery is to be put into service. Accordingly, another object of the invention is to provide suitable cells and batteries of the reserve type for the purposes described.

Rapid loading and firing of projectiles permits little time for handling and adjusting parts of the projectile itself, and it is therefore important that the electrolyte be removed from its reservoir and be distributed to the cell elements automatically and promptly when the gun is fired. Means for accomplishing this result are also among the important objects of the invention.

Another object of the invention is to provide a deferred action type of galvanic cell suitable for use in a projectile to provide electricity at a voltage and current in the neighborhood of those usual in radio receiver "A" cells.

Another object is to provide a battery of the deferred action type of galvanic cells, suitable for use in a projectile, to provide electricity at a voltage and current of the general order of magnitude usual in radio receiver "B" batteries; and a further object is a plurality of such batteries sharing a common body of electrolyte.

Another object is to provide a battery of the deferred action type of galvanic cells, suitable for use in a projectile, to provide a source of bias voltage, as is customarily provided in a radio receiver by a "C" battery; a further object is to provide two or more such batteries which share a common body of electrolyte; and a further object is to provide, in combination, one or more such batteries with one or more "B" batteries, all sharing in common a body of electrolyte.

Another object is to provide a compact power supply, suitable for use in a projectile, comprising in combination one or more of each of the aforementioned "A," "B" and "C" types of batteries; and a further object is such a combination in which the reserve electrolyte is automatically distributed to all of said batteries from a single reservoir when a projectile containing the power supply is fired from a rifled gun.

In its broader aspect, the invention comprises a battery which consists essentially of a plurality of annular electrode elements assembled coaxially to form a series of cells; intercell insulation between the electrode elements; a reserve supply of electrolyte disposed generally along the axis of the annuli; means for distributing the electrolyte from the reserve supply to the electrode elements; and a rigid outer container. In some embodiments, a further cell is disposed between the reserve supply of electrolyte and the inner margins of the annular electrodes.

The invention will be described with particular reference to the accompanying drawings, in which FIG. 1 is an elevation, partly in section taken in the direction of the arrows 1—1 of FIG. 2, of a power supply comprising "A," "B" and "C" types of batteries embodying features of this invention;

FIG. 6 is an elevation, partly in section, of a "B" type of battery embodying further modifications of the corresponding type of battery illustrated in FIGS. 1 and 2;

FIG. 7 is an elevation, partly in section taken in the direction of the arrows 7—7 of FIG. 6, of a fragment of a single annular electrode element of the battery illustrated in FIG. 6, and FIG. 8 is a sectional elevation of a "B" type of battery embodying still other modifications of the corresponding type of battery illustrated in FIGS. 1 and 2.

Figure 1:
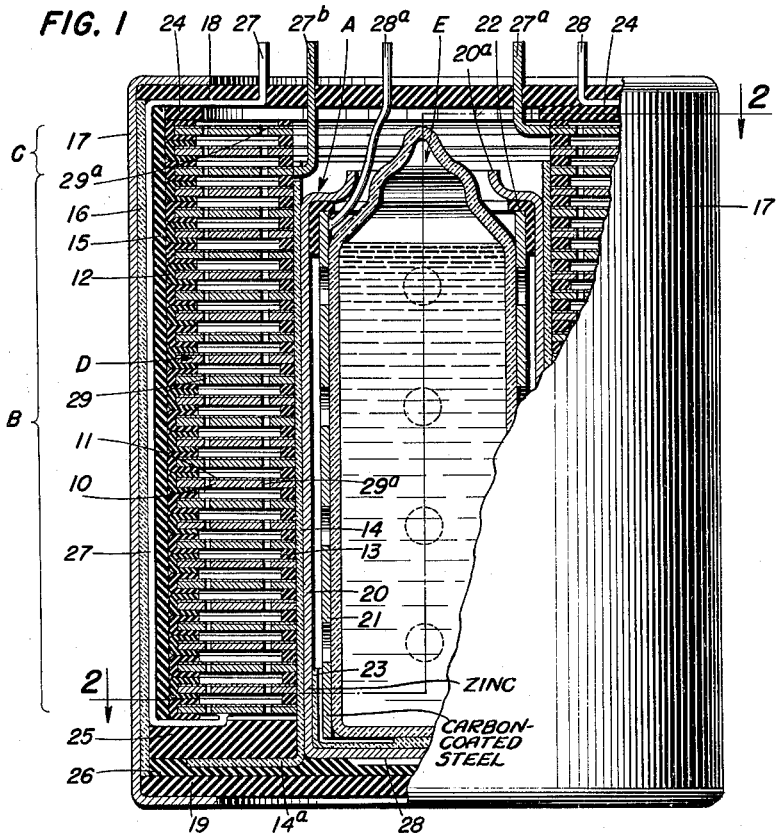
Figure 2:
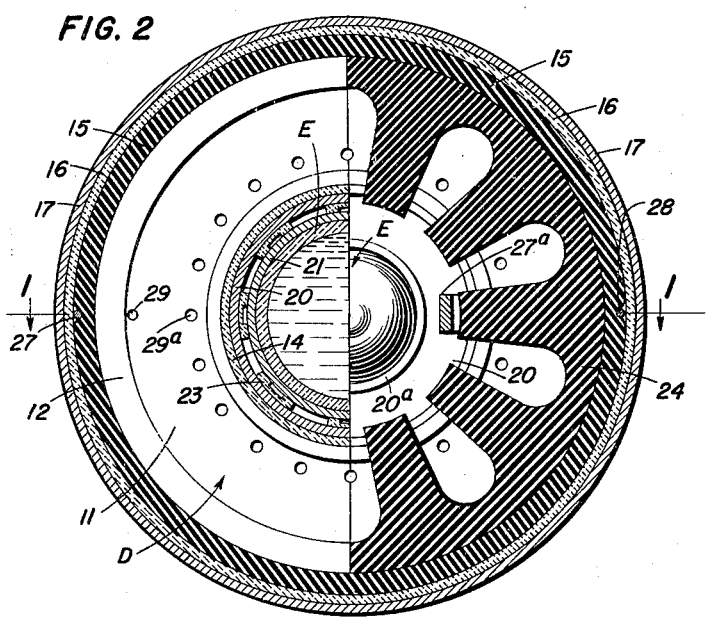
FIG. 2 is a plan, in section as indicated by the arrows 2—2 of FIG. 1, of the power supply shown in FIG. 1.
Figure 3:
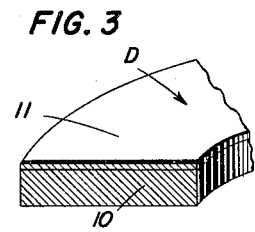
FIG. 3 is a sectioned fragment of a single pair of the annular electrode elements shown in FIGS. 1 and 2.
Figure 3:

Referring to FIGS. 1 to 3, the cylindrical device illustrated comprises a plurality of substantially flat annular electrode units D, each consisting of a soluble metal anode element 10 coated with an electrolyte-impervious electrically conductive insoluble cathode element 11, assembled coaxially in such fashion that the anode element of each unit faces the cathode element of the next adjacent unit, forming two series-connected batteries B and C; a centrally located single cell A having a soluble metal cylindrical outer anode 20 and a perforated cylindrical insoluble inner cathode 21; and a frangible ampoule E containing electrolyte.

The outer margin of each electrode unit D is enclosed by an electrically insulating, electrolyte-impervious jacket 12 serving to space, to insulate, and to seal the outer edges of adjacent electrode units, and thereby to provide between each pair of electrode units a cell for electrolyte.

The inner margins of adjacent electrode units are spaced, sealed, electrically insulated, and supported by washers 13.

The central cell A is separated and electrically insulated from the inner margins of the assembled electrode units D by a cylindrical sleeve 14.

The anode 20 and cathode 21 elements of the central cell A are supported in spaced, electrically insulated juxtaposition by a top washer 22 and a bottom washer 23, the latter being slotted to permit flow of electrolyte.

The electrode units D assembled to form batteries B and C are surrounded by a soft and yielding electrically insulating and electrolyte-sealing wrapping 15 which in turn is surrounded by a smooth rigid or semi-rigid outer sleeve 16 which facilitates slipping the assembly snugly into a rigid outer jacket 17 which may be of metal or any other suitable strong, rigid material. The assembly is maintained in tightly pressed condition by a rigid top end plate 18 and a rigid bottom end plate 19, both of electrically insulating material, held in position by inwardly extending flanges on the ends of the outer jacket 17.

The top end piece 18 is spaced from the topmost of the electrode units D by a perforated distributor plate 24 of insulating material. At the bottom of the assembly, a spacing washer 25 of insulating material is shown, the function of this washer being to compensate for a difference between the length of the assembly B and C of electrode units D and the length of the central cell A and ampoule E. A soft pad 26 between the bottom end plate 19 and the rest of the contents of the jacket 17 insures a snug fit of all parts, including electrical leads, without undue localized strains.

The cylindrical sleeve 14 is preferably cemented to the outer anode element 20 of the central cell A, and is fastened securely into the assembly, as by an extension 14a on the sleeve disposed between the spacing washer 25 and the soft pad 26, as illustrated, so that the cell A will be restrained from movement along its axis.

Electrical connections are made at each end of the assembly B—C of electrode units and may be brought to the outside, as illustrated at 27—27a. In addition, one or more connections, such as the connection 27b, may be made to tap intermediate electrodes to obtain voltages less than the total of all cells, for instance to divide the assembly into a bias-voltage battery C and a plate-current battery B. Electrical connections 28—28a are also made to the anode and cathode of the central cell A.

Although a number of different materials may be chosen for the electrode units D, zinc 10 coated with a carbon-filled conductive varnish 11, as described for instance in U.S. Patent 1,508,987, is the preferred choice. Other anode metals may be used, depending upon the type of electrolyte and upon the cell voltage desired. Instead of a carbonaceous coating, a coating of an insoluble metal such as silver, gold, or platinum may be used. The coating of cathodic material may be very thin, as long as it is sufficiently impervious to electrolyte over the service life of the cell. The coating may contain embedded but exposed particles of solid depolarizing material.

It is preferred that the cathodic coatings face the top of the battery, so that in use they will face forward. In this arrangement, there is no tendency for the setback shock to separate the coatings from the anode metal.

The electrolyte preferably contains not only the solvent for the anode metal but also a dissolved or suspended depolarizer. A preferred electrolyte is one comprising a solution of water, sulfuric acid and chromic acid, in the proportions of 0.25 to 0.5 gram of $H_2SO_4$ and 0.2 to 0.3 gram of $CrO_3$ per milliliter of electrolyte. Other appropriate electrolytes are those comprising perchloric and chromic acids; or ferric chloride; or bromine and sodium bromide. Perchloric acid electrolyte may be used also as an electrolyte in conjunction with electrodes of lead and lead oxide, respectively. All of these electrolytes are very active and promptly attack the anode metal when brought into contact therewith.

The electrolyte is stored in the electrolyte ampoule E, which is made of glass or other suitable frangible material having enough strength to withstand rough handling but which is easily shattered to small fragments by the setback shock when a projectile containing the battery is fired. When the capsule is broken, advantage is taken of the centrifugal force generated by the spin imparted to the projectile by the gun rifling, or the like, to distribute the electrolyte automatically to the various cells.

The anode 20 of the central cell A preferably is made of zinc, although other anode metals may of course be used. The cathode 21 may consist of any metal, for instance iron, coated all over with a layer of cathodic material, such as one of the materials mentioned above in connection with the electrode units D. If desired, the outer electrode 20 may be made the cathode and the electrode 21 the anode; but practical manufacturing considerations make preferable the arrangement illustrated.

The proper distribution of electrolyte to the cells poses difficult problems. The distribution must be rapid; all of the cells must be supplied with electrolyte, the annular cells being filled preferably to about the same level; the cells must not be excessively short circuited; and the central cell must retain a portion of the electrolyte while electrolyte is also distributed to the annular cells. The inertia of the electrolyte, acting against the initial forward acceleration at the moment of firing, results in fluid pressure against the bottom or rear end of the battery, and the electrolyte must be brought thence to the forward end by centrifugal force and suitable channeling.

The preferred method and means for distributing electrolyte will be, under most circumstances, as illustrated in FIGS. 1 and 2. As there shown, electrolyte flows from the shattered ampoule E into the space between the outer electrode 20 and inner electrode 21 of the cell A. The perforations in the cathode 21, and the slots in the bottom washer 23, permit free access of electrolyte to, and free egress of air from, the interelectrode space. Centrifugal forces rapidly fill such space and drive excess electrolyte out of the open top of the inner cell A. At or near the top of this cell A, the anode 20 is constricted to form a lip 20a overhanging the cathode 21, so as to trap a portion of the electrolyte at least sufficient to fill the interelectrode space between electrode elements 20 and 21 and preferably in some excess. The electrolyte not trapped within the inner cell A is thrown to the top of the device. There, the slotted spacer or distributor plate 24 guides the electrolyte to the outer periphery of the annular electrode units D. Each electrode unit D is provided with a small outer hole 29 near the outer edge, just inside the jacket 12, and with one or more inner holes 29a adjacent the inner edge just outside the washer 13. The outer holes 29 not only permit the flow of electrolyte to all intercell spaces in the stack, but also insure that the electrolyte level is substantially the same in all such spaces; yet a single small hole in each unit does not permit excessive short-circuiting current to flow in the electrolyte. If the outer holes 29a are aligned, the resistance to electrolyte flow, and hence the time required to activate the battery, is minimized, and the performance characteristics of the battery are affected. It will sometimes be desired to align these holes, and sometimes to deliberately stagger them. The inner holes 29 aid in the rapid distribution of electrolyte, permit air to escape rapidly from the intercell spaces and, if holes in adjacent electrode units are aligned, they may be used as passages for insulated electrical lead wires. An amount of electrolyte should be used eventually to supply all of the interelectrode spaces with at least a practicable minimum quantity but usually not so great as to flood the inner holes 29a under likely conditions of use. As there is usually little change in performance over a considerable range of electrolyte levels, some variation in electrolyte volume is permissible, which is of great practical importance in manufacture.

The intercell insulating jacket 12 enclosing the outer margin of each electrode unit D is preferably made of a thermoplastic synthetic resin or of rubber or other elastic and stretchable insulating material which may be formed as an endless band, stretched over the periphery of the unit, and permitted to relax into firm contact with the outer margins of the electrode unit D. Preferably, an electrolyte-impervious cement is used between the jacket and the electrode unit, and also between adjacent jackets, to improve the intercell sealing.

Instead of the jackets 12 illustrated, a washer may be used between adjacent electrode units D, each washer being cemented to the two adjacent units. Such a washer should preferably have an outside diameter somewhat greater than that of the electrode unit, for ease in assembling the battery.

The soft wrapping 15 may be a preformed sleeve which is shrunk about the assembly to fit tightly, or it may be a tightly wrapped tape, or a dipped, brushed, or sprayed coating. If it is a sleeve or tape, it may be coated with an adhesive and may suitably be made of a thermoplastic resinous composition or of a fabric coated with such a composition. A dipped, brushed, or sprayed coating may be made of a wax or wax-like substance, or of asphalt; or of a solution of a resinous, waxy, gum-like, or rubber-like material in a volatile solvent. The wrapping may be omitted under some circumstances.

The rigid outer sleeve 16 may be made of cellulose nitrate or acetate sheet or any other smooth rigid or semirigid material, either nonmetallic or metallic. Its function being chiefly to simplify assembly of the device and only incidentally to provide additional electrical insulation and physical support, it may be omitted on occasion, as indicated in FIGS. 4 to 8, inclusive.

The rigid outer jacket 17 is preferably made of sheet steel, but other suitable materials may be used. The end plates 18 and 19, and the various insulating washers 13, 22, 23 and 25, and the distributor 24 may be made of any suitable strong, rigid, insulating material of good quality.

Electrical connections for tapping electrode units D, not far removed from the ends of the devices, may conveniently be provided by originally shaping such electrode unit with a tab 27b extending across the central opening. The tab 27b may then be bent and brought through slots in the end plates, as illustrated.

In the event that only the single cell A is needed, it may be used separately, the amount of electrolyte being decreased accordingly, the top of the cell being sealed, and a suitable supporting jacket being constructed about the cell.

Conversely, if only the outer cells are needed, the inner cell A may be omitted. In this case, the function of inner cell A may be supplied by connecting in parallel or parallel series, a number of the outer annular cell units.

Other electrolyte-distributing means than those illustrated in FIGS. 1 and 2 are within the invention. Typical modifications are shown in FIGS. 4 to 8, inclusive, in which for simplification of the drawings the central cell A is omitted.

In the modification illustrated in FIGS. 4 to 7, inclusive, a pair of washers 30 and 31, the latter slotted, perform the functions of the slotted distributor plate 24 of FIGS. 1 and 2; and an insulating cup 34, cemented at the bottom to the end plate 19, replaces the cylindrical sleeve 14 of FIGS. 1 and 2.

Figure 4:
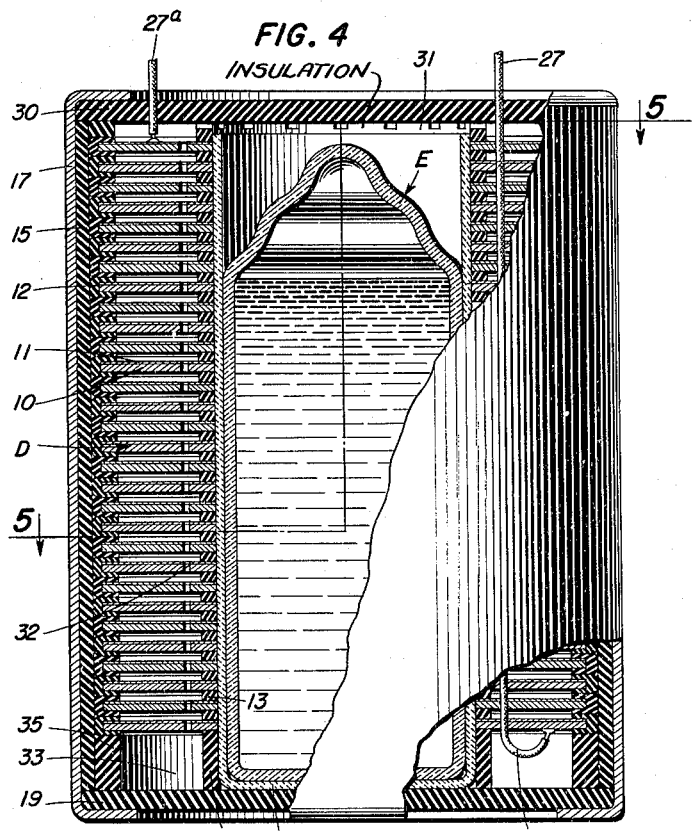
FIG. 4 is an elevation, partly in section taken in the direction of the arrows 4—4 of FIG. 5, of a "B" type of battery embodying several modifications of the corresponding type of battery illustrated in FIGS. 1 and 2.
Figure 5:
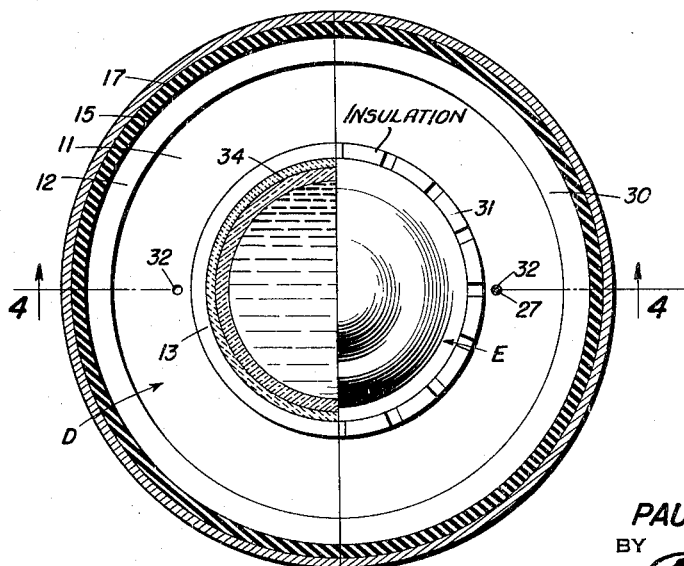
FIG. 5 is a plan, in section as indicated by the arrows 5—5 of FIG. 4, of the battery illustrated in FIG. 4.

As illustrated in FIGS. 4 and 5, no electrolyte-leveling openings are provided in the outer parts of the electrode units D. Instead, each unit is provided with one or more small apertures 32 near the inner edge of the unit. These apertures, which may be but need not be aligned with corresponding apertures of adjacent units, are equidistant from the long axis of the assembly of electrode units, and thus not only permit the flow of electrolyte from one cell to the next but also determine the electrolyte level. In order to assure the filling of each cell, an excess of electrolyte should be used and a reservoir 33 should be provided at the bottom of the assembly to receive the overflow. The reservoir 33 is provided by a pair of spacing rings 35 and 36.

If more than one aperture 32 is in each electrode unit D, and the apertures in adjacent electrode units are aligned, electrical leads may be brought through the assembly in the extra apertures.

In the modification illustrated in FIGS. 6 and 7, V-shaped slots 37 are used to distribute electrolyte among the cells. Such slots by virtue of their shape have the advantages of permitting a more rapid initial flow of electrolyte and displacement of air, and of minimizing the eventual degree of short circuiting of the cells.

As illustrated in FIGS. 6 and 8, separator discs 38 may be used instead of the inner washers 13 shown in FIGS. 1 to 5, inclusive. If the width of the electrode units D is not made too great, the inner edges of the units may be left unsupported by either washers 13 or discs 38.

It will be observed that in FIG. 6 the slotted electrolyte distributor washer 31 is arranged at the bottom of the assembly, the reservoir 33' is at the top, and the insulating cup 34 of FIG. 4 is omitted. With this arrangement, the electrolyte travels directly into the cells from the bottom of the broken ampoule E, instead of going first to the top of the cup 34 (FIG. 4) and then down into the cells, thereby shortening the time between the breaking of the ampoule and the activation of the battery.

A further modification of the invention is illustrated in FIG. 8. In this modification the reservoir 33a is at the front end of the battery as in FIG. 6, and the electrode elements D have slots 37a at their inner edges, as in FIGS. 6 and 7, but the outer ends of the slots in successive electrode elements from top to bottom are progressively further from the axis. With this arrangement of slots, all of the interelectrode spaces will be filled and yet the electrolyte level in each such space will be lower (further from the axis) than that in the next forward space, thereby avoiding a short-circuiting electrolyte path between adjacent cells. The slots need not be V-shaped, but may be of any suitable shape. Instead of using slots, the central holes of the electrode units may be punched progressively larger or progressively further off-center, so that upon assembly of the units D with the axes of the outer diameters in alignment, the electrolyte levels will be progressively further from the central axis of the battery as described above.

The device of the invention may be assembled readily in any of a number of ways. For instance, to assemble the device shown in FIGS. 1 to 3, the jacket 12 may be placed on and cemented to each electrode unit D. Then, over a mandrel there may be placed a series of electrode units D separated by inner washers 13, preferably with cement on the top and bottom surfaces of the jackets. The pile of units so formed may be compressed, the soft wrapping 15 may be applied, and the cement at least partially set so that upon removal of the pressure and withdrawal of the mandrel, a self-sustaining sub-assembly is obtained. The inner cell A is assembled about the ampoule E, the sleeve 14 is cemented thereto, and the sub-assembly so obtained is slipped into the center of the first-mentioned sub-assembly. The electrical leads are connected and arranged in their proper places in the assembly, the rigid outer sleeve 16 is slipped on, the whole is slipped into the outer jacket 17 and compressed and held in place by crimping the wall of the jacket 17, the end washers and plates are added, the wiring is brought through the end washers and plates, and the ends of the jacket 17 are rolled over to seal the unit and maintain the compression.

As previously indicated, cement-coated washers may be substituted for the jackets 12, and cement-coated spacing discs 38 may be substituted for the inner washers 13, or the inner supporting members may be omitted, in the assembling of the device.

It is apparent that numerous minor modifications of details illustrated or described may be made without departing from the invention, and it is also evident that various combinations of the described features, other than those chosen for illustration, are within the scope of the invention. Further, in the drawings the thickness of section of some parts has necessarily been considerably exaggerated for purposes of clarity. Therefore, the drawings and the description thereof are to be understood as examples illustrating typical embodiments of the invention, and the scope of the invention is not limited to or by such examples.

It is also apparent that the device of this invention may be used, not only in a projectile, but also in any other article wherein the ampoule may be shattered in suitable manner to release the electrolyte and the device may then be subjected while in operation to rapid rotation about its longitudinal axis.

I claim:

1. Galvanic battery of the deferred action type, suitable for use in a projectile, comprising a plurality of electrode units assembled coaxially, and each unit having on one face a soluble anode metal and on its opposite face an electrolyte-impervious electrically-conductive insoluble cathode material, a reserved supply of electrolyte mounted within said units; insulating material disposed between the outer peripheral margins of adjacent units to provide between each pair of units a space for electrolyte; and a rigid outer container; said units having means for distributing electrolyte to the cells when said cells are rotated about the axis of said units.

2. Galvanic battery of the deferred action type, suitable for use in a projectile, comprising a plurality of flat annular electrode units assembled coaxially, and each unit having on one face a soluble anode metal and on its opposite face an electrolyte-impervious electrically-conductive insoluble cathode material, a reserved supply of electrolyte disposed generally along the axis of said units; insulating material disposed between the outer peripheral margins of adjacent units to provide between each pair of units a space for electrolyte; and a rigid outer container; said units having means for distributing electrolyte to the cells when said cells are rotated about the axis of said units.

3. Galvanic battery of the deferred action type, suitable for use in a projectile, comprising a plurality of flat annular electrode units assembled coaxially, and each unit having on one face a soluble anode metal and on its opposite face an electrolyte-impervious electrically-conductive insoluble cathode material, a reserved supply of electrolyte mounted within the units; insulating material disposed between and sealed to the outer peripheral margins of adjacent units to provide between each pair of units a space for electrolyte; and a rigid outer container; said units having means for distributing electrolyte to the cells when said cells are rotated about the axis of said units.

4. Galvanic battery of the deferred action type, suitable for use in a projectile, comprising a plurality of annular electrode units assembled coaxially, and each annulus having on one face a soluble anode metal and on its opposite face an electrolyte-impervious electrically-conductive insoluble cathode material, a reserved supply of electrolyte mounted within the units, insulating material disposed between the outer peripheral margins of adjacent annuli to provide between each pair of annuli a space for electrolyte; and a rigid outer container; said annuli having means for distributing electrolyte to the cells when said cells are rotated about the axis of the annuli.

5. Galvanic battery of the deferred action type, suitable for use in a projectile, comprising a plurality of annular electrode units assembled coaxially, each of said annular electrode units having on one face a soluble anode metal and on its opposite face an electrolyte-impervious electrically-conductive insoluble cathode material, a reserved supply of electrolyte disposed generally along the axis of the annuli; insulating material disposed between and sealed to the outer peripheral margins of adjacent annuli to provide between each pair of annuli a space for electrolyte; and a rigid outer container; each of said annuli being provided with at least one aperture connecting adjacent cells.

6. Galvanic battery of the deferred action type, suitable for use in a projectile, comprising a plurality of substantially flat annular soluble metal elements each provided with at least one small aperture and each coated on one flat surface with an electrically-conductive electrolyte-impervious carbonaceous layer to form an electrode unit, said units being assembled coaxially with the coated surfaces uppermost; insulating material disposed between and sealed to the outer peripheral margins of adjacent units to provide between each pair of units a cell for electrolyte; rigid insulating material disposed between and sealed to the inner peripheral margins of adjacent units to support said margins; at one end of the so assembled units an electrolyte distributor provided with apertures communicating with the apertures in said units and with the axial cavity defined by the assembled annular units; in said axial cavity a frangible ampule containing a reserved supply of electrolyte; and a rigid outer container.

7. Galvanic battery as claimed in claim 6, wherein each electrode unit is provided with at least one aperture serving to interconnect adjacent electrolyte cells and located adjacent to the inner margin of the unit.

8. Galvanic battery as claimed in claim 6, wherein each electrode unit is provided with a plurality of apertures serving to interconnect adjacent electrolyte cells and located adjacent to the inner margin of the unit, and wherein at least one end unit is spaced from the end of the outer container to provide an electrolyte reservoir.

9. Galvanic battery as claimed in claim 6, wherein each electrode unit is provided with a V-shaped slot entering its inner margin, the axis of the slot being on a radius of the unit and the apex thereof being outermost.

10. Galvanic battery as claimed in claim 6, wherein each electrode unit is provided with at least one small aperture adjacent its outer margin and communicating with adjacent electrolyte cells, and with at least one large aperture adjaecnt its inner margin and interconnecting such adjacent cells; the last-mentioned aperture or apertures serving to permit rapid filling of the cells with electrolyte and the first-mentioned aperture or apertures serving to maintain substantially the same electrolyte level in all cells of the battery.

11. Galvanic battery as claimed in claim 6, wherein the soluble metal element is zinc and the electrolyte is an aqueous solution containing, per milliliter, 0.25 to 0.5 gram of $H_2SO_4$ and 0.2 to 0.3 gram of $CrO_3$.

12. Galvanic battery as claimed in claim 6 further comprising a cylindrical cell surrounding the frangible ampule and within the axial cavity defined by the assembled annular electrode units; such cylindrical cell comprising cylindrical anode and cathode elements in spaced juxtaposition, one surrounding the other, the inner being perforate and the outer imperforate, and an upper portion of said cell being of less diameter than the lower to confine a portion of electrolyte between said cylindrical electrodes.

References Cited in the file of this patent

UNITED STATES PATENTS

| | | |
|---|---|---|
| 341,536 | Zalinski | May 11, 1886 |
| 902,173 | Schauli | Oct. 27, 1908 |
| 1,334,849 | Fraley | Mar. 23, 1920 |
| 1,381,298 | Gill | June 14, 1921 |
| 1,644,017 | Hendry | Oct. 4, 1927 |
| 2,147,116 | Winckler | Feb. 14, 1939 |
| 2,307,627 | Lawson | Jan. 5, 1943 |
| 2,403,567 | Wales | July 9, 1946 |

FOREIGN PATENTS

| | | |
|---|---|---|
| 49 | Great Britain | 1891 |
| 526,800 | Great Britain | Sept. 25, 1940 |